US007694332B2

(12) United States Patent  
Yuan et al.

(10) Patent No.: US 7,694,332 B2
(45) Date of Patent: Apr. 6, 2010

(54) DIGITAL RECEIPT FOR A TRANSACTION

(75) Inventors: Xinhong Yuan, San Jose, CA (US); Stan J. Simon, Mountain View, CA (US); Robert W. Pratt, Woodside, CA (US); Gregory R. Whitehead, Menlo Park, CA (US); Atul Tulshibagwale, San Jose, CA (US)

(73) Assignee: VeriSign, Inc., Mountain View, CA (US)

( * ) Notice: Subject to any disclaimer, the term of this patent is extended or adjusted under 35 U.S.C. 154(b) by 1148 days.

(21) Appl. No.: 09/907,788

(22) Filed: Jul. 17, 2001

(65) Prior Publication Data

US 2002/0161721 A1 Oct. 31, 2002

Related U.S. Application Data

(60) Provisional application No. 60/221,854, filed on Jul. 28, 2000.

(51) Int. Cl.
  *G08B 23/00* (2006.01)
  *G06F 7/04* (2006.01)
(52) U.S. Cl. .................... 726/10; 713/178; 713/176
(58) Field of Classification Search ............... 713/176, 713/178; 726/10
  See application file for complete search history.

(56) References Cited

U.S. PATENT DOCUMENTS 5,479,509 A   12/1995   Ugon ........................... 380/23
5,497,422 A * 3/1996   Tysen et al. ................. 713/157
5,915,022 A * 6/1999   Robinson et al. ............... 705/75
6,192,381 B1 * 2/2001  Stiegemeier et al. ........ 715/505
6,327,656 B2 * 12/2001 Zabetian ..................... 713/176
6,584,507 B1 * 6/2003  Bradley et al. ............... 709/229
7,142,676 B1 * 11/2006 Hillier et al. ................. 380/278

FOREIGN PATENT DOCUMENTS

EP    0 969 430 A1    1/2000
WO    WO 96/13921 A1   5/1996
WO    WO 00/25245 A1   5/2000
WO    WO 00/75834 A2   12/2000
WO    WO 01/60020 A1   8/2001

OTHER PUBLICATIONS

Menkus, B., "A Secure Electronic Document Audit Trail Product," EDPACS, Auerbach Publishers, New York, NY, vol. 22, No. 12 (Jun. 1995), pp. 15-16.

* cited by examiner

*Primary Examiner*—Christopher J Brown
(74) *Attorney, Agent, or Firm*—Townsend and Townsend and Crew LLP

(57) ABSTRACT

A first user (110) requests a service provider (130) to create (200,400) a record of a transaction. The service provider (130) creates (230,430) a digital receipt (300,700,900), which includes a description (310,710,720,910,1020) of the transaction understandable by humans, tamper-proof evidence (320) of the transaction, and a verification prompt (330,740, 940,1030). A second user (120) who desires to verify the transaction displays (265,465) the digital receipt (300,700, 900) and activates (270,470) the verification prompt (330, 740,940,1030). Upon activation, the tamper-proof evidence (320) is verified without requiring further human interaction to identify the tamper-proof evidence.

22 Claims, 12 Drawing Sheets

DIGITAL RECEIPT FOR A TRANSACTION

CROSS-REFERENCE TO RELATED APPLICATION

This application claims the benefit of U.S. Provisional Patent Application Ser. No. 60/221,854, "Interactive Digital Receipts", by Xinhong Yuan and Stan Simon, filed Jul. 28, 2000, which subject matter is incorporated herein by reference.

BACKGROUND OF THE INVENTION

1. Technical Field

This invention relates generally to public key cryptography, digital signatures and public key infrastructure (PKI). More specifically, it relates to the generation and use of records and digital receipts for transactions.

2. Background Art

As a result of the increasing popularity and acceptance of the computer and the Internet and other forms of networked communications, electronic transactions and documents are increasing in number and significance. For example, the volume of consumer purchases, business to business commerce, and stock trading and other forms of investing which occur over the Internet and/or wireless networks is steadily increasing, as are other forms of online commerce. In addition, the number of documents which are generated or available electronically and the number of documents which exist only in electronic form (e.g., the paperless office) are also steadily increasing.

The increasing number of electronic transactions and documents leads to a corresponding need for reliable methods for making records of these transactions and documents. For example, when a consumer purchases an item over the Internet using his credit card, it is desirable to make a reliable, non-disputable record of the purchase. If two corporations electronically "sign" a contract, it is desirable to record both the act of signing and the contents of the contract. In the paperless office, it is desirable to "digitally notarize" certain documents, thus ensuring that their existence at a specific time can be proved at a later date.

One approach to the records problem makes use of cryptography. The characteristics of pubic key cryptography in particular may be used in various ways to make strong records of transactions. For example, in the consumer Internet example, a consumer with a digital certificate might create a digital signature of his order including the credit card number, thus creating a record of the purchase. In the contract example, the two corporations might similarly create a two-party digital signature of the contract, each corporation using its digital certificate. In the digital notary example, a third party (i.e., the notary) might witness the document by affixing a time stamp and a digital signature to the document.

However, in order to gain widespread acceptance, these approaches should be intuitive and easy to use. One problem with past attempts to create an infrastructure of transaction records is that they were too cumbersome and difficult to use. For example, in many approaches, a digital signature is generated to witness a transaction and these digital signatures are stored in case there is a future need for them. However, digital signatures are unintelligible to humans. Thus, in order to find the correct digital signature for a specific case, the digital signatures must be securely stored with a description of the transaction. Once the correct digital signature is located, further processing is required to make the contents of the digital signature useful to humans.

These functions are often performed by separate pieces of software. For example, database software may be used to store the digital signatures and their corresponding software in a large central database. Browser plug-in software may be used to process the correct digital signature once it is located. However, this approach may be both cumbersome and non-intuitive. The central database requires access to the database in order to locate the correct records. Thus, it is difficult for one entity to send a copy of the record of the transaction to another entity, particularly if either entity does not have access to the database at the time. A similar problem occurs if an entity does not have the correct browser plug-in or does not know how to use the plug-in.

Thus, there is a need for simple and intuitive approaches to making and using records of transactions and documents. There is a further need for approaches which allow these records to be easily moved around without compromising their integrity.

DISCLOSURE OF INVENTION

In accordance with the present invention, a computer readable medium serves as a record of an occurrence of a transaction. The computer readable medium stores a digital receipt (300,700,900) of the transaction which is suitable for display to humans. The digital receipt (300,700,900) includes a description (310,710,720,910,1020) of the transaction in a format understandable by humans, some tamper-proof evidence (320) of the occurrence of the transaction, and a verification prompt (330,740,940,1030). The tamper-proof evidence (320) preferably is hidden from display. Activating the verification prompt (330,740,940,1030) verifies the tamper-proof evidence (320) without requiring further human interaction to identify the evidence.

In one embodiment, the computer readable medium serves as a record of the existence of a document at a specific time. The digital receipt (700) includes a form in a standard markup language, such as HTML or XML, and contains a name (710) identifying the document, a time (730) identifying the specific time, a digitally signed time stamp token encoded as hidden text in the form, and a verification button (740). The time stamp token includes a fingerprint of the document (e.g., a hash of the document), and a time stamp for the document. Activating the verification button (740) transmits the hidden text to a service provider(130) for verification. In another embodiment, the form also includes the document (910) itself encoded as hidden text. Activation of the verification prompt (940) transmits also the hidden text of the document to the service provider (130) for verification.

In another aspect of the invention, a method (200,400) for creating a record of an occurrence of a transaction includes the following steps. A request to create a digital receipt (300, 700) of the transaction is received (210,410). Tamper-proof evidence (320) of the occurrence of the transaction is generated (220,420). A digital receipt (300,700,900) of the transaction is created (230,430). The digital receipt (300,700,900) is suitable for display to humans and includes a description (310,710,720,910,1020) of the transaction, the generated tamper-proof evidence (320), and a verification prompt (330, 740,940,1030). Upon activation of the verification prompt, the evidence (320) is verified without requiring further human interaction to identify the evidence.

In another aspect of the invention, a method (250,450) for verifying the past occurrence of the transaction includes the following steps. The digital receipt (300,700,900) described above is displayed (265,465) and the verification prompt (330,740,940,1030) is activated (270,470), thus initiating verification of the tamper-proof evidence (320). In one embodiment, verification of the evidence is received (295, 495) and, upon its receipt, a second verification prompt is displayed. Activating (202,402) the second prompt then verifies (202,404,406) the underlying transaction.

The methods (200,250,400,450) in the previous two paragraphs are preferably implemented by software executing on a processor.

The present invention is particularly advantageous because the digital receipt (300,700,900) includes both a verification prompt (330,740,940,1030) and the tamper-proof evidence (320) to be verified. This makes the digital receipt (300,700, 900) easier and more intuitive to use. For example, if the digital receipt (300,700,900) did not include the verification prompt (330,740,940,1030), then separate software or instructions would be required to verify the evidence (320). Alternately, if the digital receipt (300,700,900) did not include the evidence (320), then the evidence (320) would first have to be obtained from a separate source. Either of these present a problem if the user (120) does not have convenient access to the missing piece. By including both the verification prompt (330,740,940) and the evidence (320) to be verified, the digital receipt (300,700,900) is self-contained and avoids this problem. Thus, for example, the digital receipt (300,700,900) may be sent to someone else (120) who could verify it by activating (270,470) the verification prompt (330, 740,940,1030).

BRIEF DESCRIPTION OF THE DRAWINGS

The invention has other advantages and features which will be more readily apparent from the following detailed description of the invention and the appended claims, when taken in conjunction with the accompanying drawing, in which:

DETAILED DESCRIPTION OF THE PREFERRED EMBODIMENTS

Figure 1:
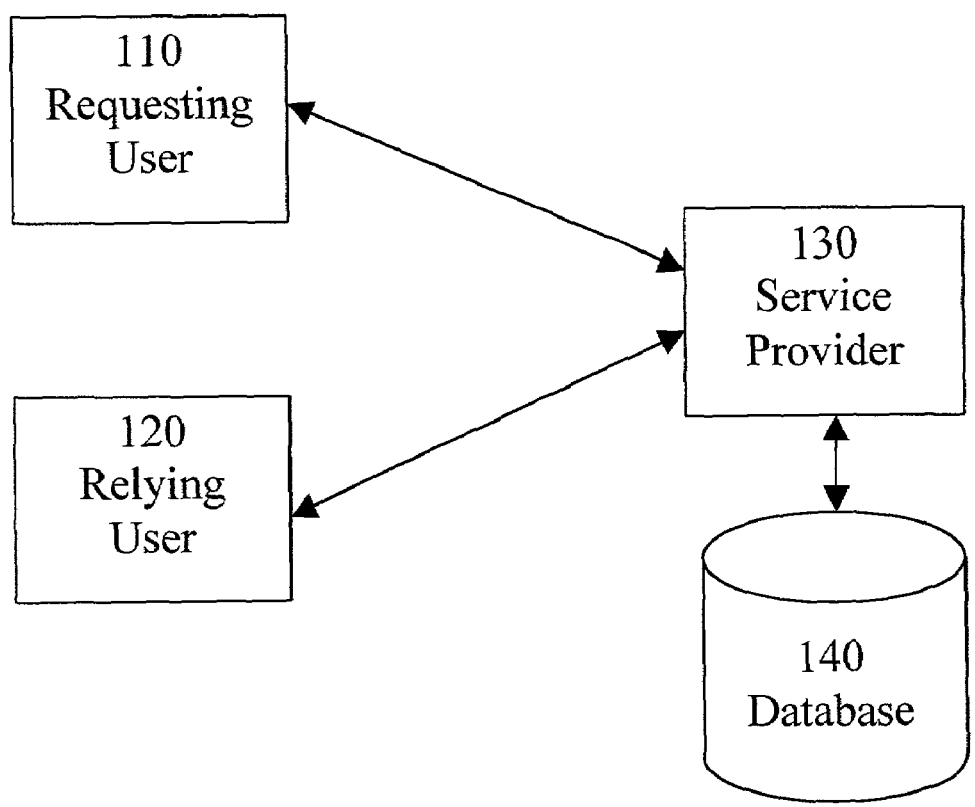
FIG. 1 is a block diagram of a system according to the present invention.

This invention relates generally to public key cryptography, digital signatures, and digital certificates issued by a certification authority (CA), which together form part of a public key infrastructure (PKI) for securing on-line transactions. Before turning to the figures, it is useful to first describe these underlying concepts.

Public key cryptography is an approach to secure communications using key pairs. Each key pair includes a public key and a private key, each of which is typically a large number. The private key is securely held by the entity; while the public key is made widely available. The public key and private key are mathematically related so that a message encrypted by one key may be decrypted by the other, but the relationship is such that it is computationally infeasible to calculate one key given the other. In other words, if a third party knows an entity's public key (which is typically the case), it is computationally infeasible to deduce the corresponding private key (which is typically held securely by the entity). Well-known public key encryption algorithms include RSA, DSA and ElGamal.

These key pairs may be used to "digitally sign" documents. An entity "digitally signs" a document by encrypting either the document or a processed version of the document using the entity's private key. This allows a third party to authenticate the document by verifying that (i) it is the entity's private key (rather than some other key) which has been used to digitally sign the document; (ii) the contents of the document have not changed since the document has been digitally signed; and (iii) the entity cannot later deny that he digitally signed the document. The first characteristic is often referred to as "paternity," the second as "integrity," and the third as "non-repudiation."

Preferably, a document is digitally signed by first producing a one-way hash (see below) of the document, creating what is commonly referred to as a document digest. The document digest is then encrypted using the entity's private key to produce the digital signature for the document. A third party typically receives both the document and corresponding digital signature and then authenticates the document as follows. The third party decrypts the received digital signature using the entity's public key to yield a decrypted document digest, which should be identical to the original document digest. The third party also generates a one-way hash of the received document, using the same hash function as was used by the entity, to yield a newly generated document digest. The third party then compares the decrypted document digest and the newly generated document digest. If they are identical, the third party has authenticated the document.

A hash function is a transformation that takes a variable-size input and returns a fixed-size output, which is typically smaller than the input and is referred to as the hash of the input. A one-way function is a transformation that is significantly easier to perform in one direction than in the opposite direction. A one-way hash function is thus a transformation with both of these characteristics. One-way hash functions used to produce digital signatures preferably also produce outputs which are generally smaller in size than the input, are able to handle inputs of any size, and are collision-free to some degree. Hash functions, by their nature, are many-to-one functions, meaning that many inputs may map to the same output. However, if the hash function is collision free, this potential problem is obviated for all practical purposes. A hash function is weakly collision free if, given an input, it is computationally infeasible to find another input which maps to the same output. A hash function is strongly collision free if it is computationally infeasible to find any two inputs which map to the same output. Well-known one-way hash functions include MD2, MD5 and SHA-1.

The use of public key cryptography addresses many of the inherent security problems in an open network such as the Internet. However, without more, two significant problems remain. First, parties must be able to access the public keys of many entities in an efficient manner. Second, since communications and transactions are secured by the key pairs and entities are associated with and in some sense identified by their public keys, there must be a secure method for third parties to verify that a certain public key really belongs to a certain entity.

Digital certificates are one method for addressing both of these problems. A "digital certificate" is a document which binds a certain public key to a certain entity, such as individuals, legal entities, web servers, and the like, in a trustworthy manner. More specifically, a digital certificate preferably is issued by a trusted third party, commonly referred to as the certification authority (CA). The digital certificate contains information pertaining to the identity of the entity (a.k.a., subscriber of the digital certificate) and the entity's public key, and the digital certificate is digitally signed by the CA.

The digital certificate documents in a trustworthy manner that the public key in the digital certificate is bound to the certificate's subscriber. Third parties who wish to verify this information may verify the authenticity of the CA's digital signature and the integrity of the contents of the digital certificate in the manner described above. If the third party trusts the CA, then he can also trust that the public key in the digital certificate is bound to the certificate's subscriber. Hence, if an unknown party communicates with the third party using the private key corresponding to the public key in the digital certificate, the third party can further trust that the unknown party is the subscriber named in the digital certificate. If the third party does not have a basis for trusting the CA, the third party will begin to establish such a basis by authenticating the CA's digital certificate. The third party will continue to authenticate digital certificates, traversing up a chain of digital certificates issued to CAs, until it reaches a CA which it trusts, at which point, the third party can trust that the public key in the digital certificate is bound to the certificate's subscriber.

Digital certificates preferably comply with the format defined by ITU Recommendation X.509 (1997 E): Information Technology—Open Systems Interconnection—The Directory: Authentication Framework, June 1997. The digital certificate may be stored on or in any type of computer readable media, including but not limited to hard drives, smart cards, flash memory, magnetic stripes such as on the back of credit cards, or as printed bar codes.

For security and other reasons, digital certificates typically are valid for a limited period of time only. For example, when digital certificates are issued, they may have an effective date and an expiration date, with the digital certificate being valid only between these dates. Furthermore, if a digital certificate is compromised prior to its expiration date, it may be revoked, with the digital certificate being placed onto a certificate revocation list.

A PKI is a system for implementing security using public key cryptography and digital certificates. Certain services are used to establish, disseminate, maintain, and service the public keys and associated digital certificates used in a PKI. These services are provided by entities which shall be referred to as service providers. For security, efficiency, and other reasons, service providers often are also CAs and must be CAs in order to provide some services. Examples of such services include issuing new digital certificates, checking the validity of digital certificates, generating digital signatures, and/or maintaining records of transactions utilizing the PKI.

FIG. 1 is a block diagram of an example system 100 according to the present invention. The system 100 includes a requesting user 110, a relying user 120 and a public key infrastructure (PKI) service provider 130, which communicate with each other. System 100 optionally includes a database 140 of transaction records which is accessible by the service provider 130.

The users 110 and 120 may be individuals, groups of individuals, legal entities such as corporations, computers, or the like. The service provider 130 is an entity which provides services associated with the operation of a PKI. In this particular example, service provider 130 provides digital notary services to generate and subsequently verify records of transactions. The service provider 130's records are stored in database 140, which typically is maintained with high security and reliability in order to enhance the trustworthiness of the records in the database 140 and of the services provided by service provider 130.

The users 110 and 120 communicate with the service provider 130 and may also communicate with each other. The communications connections may be made by any number of means, including over computer networks such as the Internet and/or by wireless connections. The connections need not be permanent or persistent. In a preferred embodiment, the users 110 and 120 use standard web browsers to communicate with the service provider 130's web server over the Internet, using the HTTP protocol.

The requesting user 110 wishes to make a record of a transaction and engages the service provider 130 to do so. The relying user 120 later wants to verify the occurrence of the transaction and does so by relying on the record created by the service provider 130. The service provider 130 may provide further assurance by processing the record to verify the record's or the underlying transaction's authenticity. As one example, the transaction may be the online purchase of an item, with the service provider 130 making a record to witness the purchase. Alternately, the transaction may be the existence of a document, with the service provider 130 making a record to witness the contents of the document at a specific time. In this case, the service provider 130 essentially plays the role of a digital notary.

The term "transaction" is used broadly. It includes events, such as an online purchase of goods or the electronic signing of a contract, as well as documents. The example of FIG. 2 is illustrated in the context of creating a record of a "transaction" in the general sense of the term. The preferred embodiment of FIGS. 4-8 uses a notary example, where witnessing the "transaction" means witnessing the existence of a specific document at a specific time. The preferred embodiment of FIG. 9 uses an example where the transaction is an on-line purchase. However, it should be understood that the principles illustrated in these two latter examples are also applicable to other types of transactions. The term "document" is also used broadly. It includes any type of electronic content, including for example audio or video files, software code, animations, and data files, in addition to electronic versions of traditional paper documents.

Figure 2A:
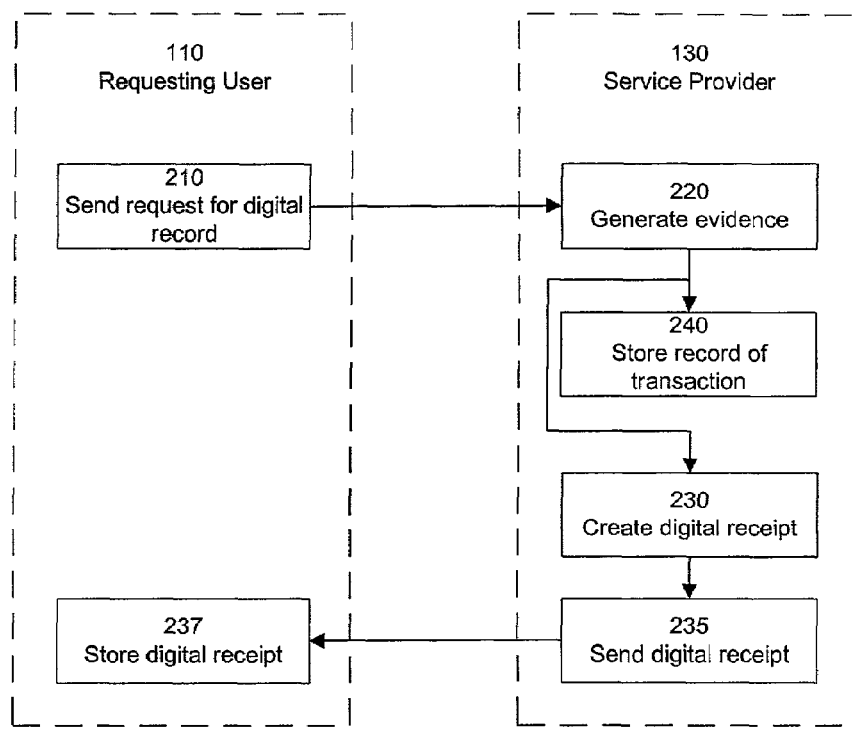
FIGS. 2A and 2B are event traces illustrating a method of operating the system of FIG. 1.
Figure 2B:
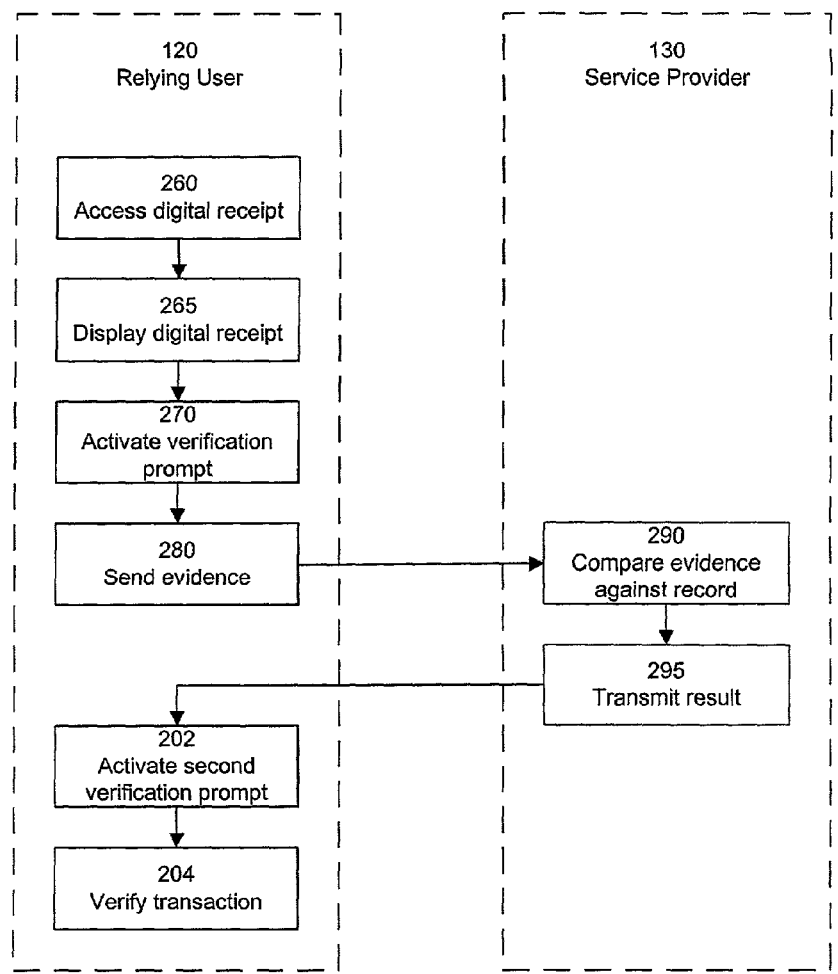

FIGS. 2A and 2B are event traces illustrating operation of system 100. FIG. 2A illustrates record creation 200, during which the service provider 130 creates a digital record of the transaction for the requesting user 110. FIG. 2B illustrates record verification 250, during which the service provider 130 (which could be a different service provider) verifies the digital record and/or the underlying transaction to the relying user 120 (which could be the same as the requesting user 110). Not all implementations will utilize both stages 200 and 250 or all of the individual steps shown, but they are all included to illustrate various aspects of the invention.

In FIGS. 2A and 2B, each of the dashed boxes 110, 120, and 130 represents one of the components in system 100. The solid boxes represent various steps in the methods. The location of a solid box within a dashed box indicates that the step is generally performed by that component. For example, step 210 is located within the dashed box for the requesting user 110. This indicates that the requesting user 110 generally performs step 210 of transmitting a request to the service provider 130. However, as will be clear from the examples below, this is not meant to imply that the service provider 130 plays no role. For example, completing the request may be an interactive effort involving both user 110 and service provider 130 and, at the very least, the service provider 130 will receive the request transmitted by user 110. The steps preferably are implemented by software running on the various components within system 100, possibly assisted by specialized hardware modules. They can also be implemented in hardware and/or firmware.

Referring to FIG. 2A, the requesting user 110 begins by sending 210 to the service provider 130 a request to create a digital record of a transaction. The request typically includes a description of the transaction in a format understandable by humans. For example, the requesting user 110 might create a short text description of the transaction or send an icon representing the transaction, or a short summary of the transaction may be automatically generated when the transaction occurs. The request also includes information to be processed by the service provider 130 in creating the digital record. This information may be provided in standardized formats to facilitate processing and may be unintelligible to humans. In the online purchase scenario, this information might include details on the transaction and/or confirmation that the transaction occurred, for example credit card number, amount of purchase, credit card authorization code, etc. In the online contract signing scenario, the digital certificates or similar information of the signing parties might be included. In the document notary scenario, the document itself might be included.

The service provider 130 receives 210 both the human-understandable description and the additional information. It processes the additional information to generate 220 tamper-proof evidence of occurrence of the transaction (e.g., a digital signature). The tamper-proof evidence preferably cannot be changed at a later time without the change being detected. For example, the service provider might provide time stamping, hashing, and/or digital signature functions as part of this processing. It might also add further information from other sources. The exact type or processing and evidence generated will depend on the specific application. The service provider stores 240 a record of the transaction, preferably in its database 140. In a preferred embodiment, this record includes the human-understandable description provided 210 by the requesting user 110, the tamper-proof evidence generated 220 by the service provider 130, and also information concerning the user 110's request to create a digital record and the identity of user 110.

Figure 3:
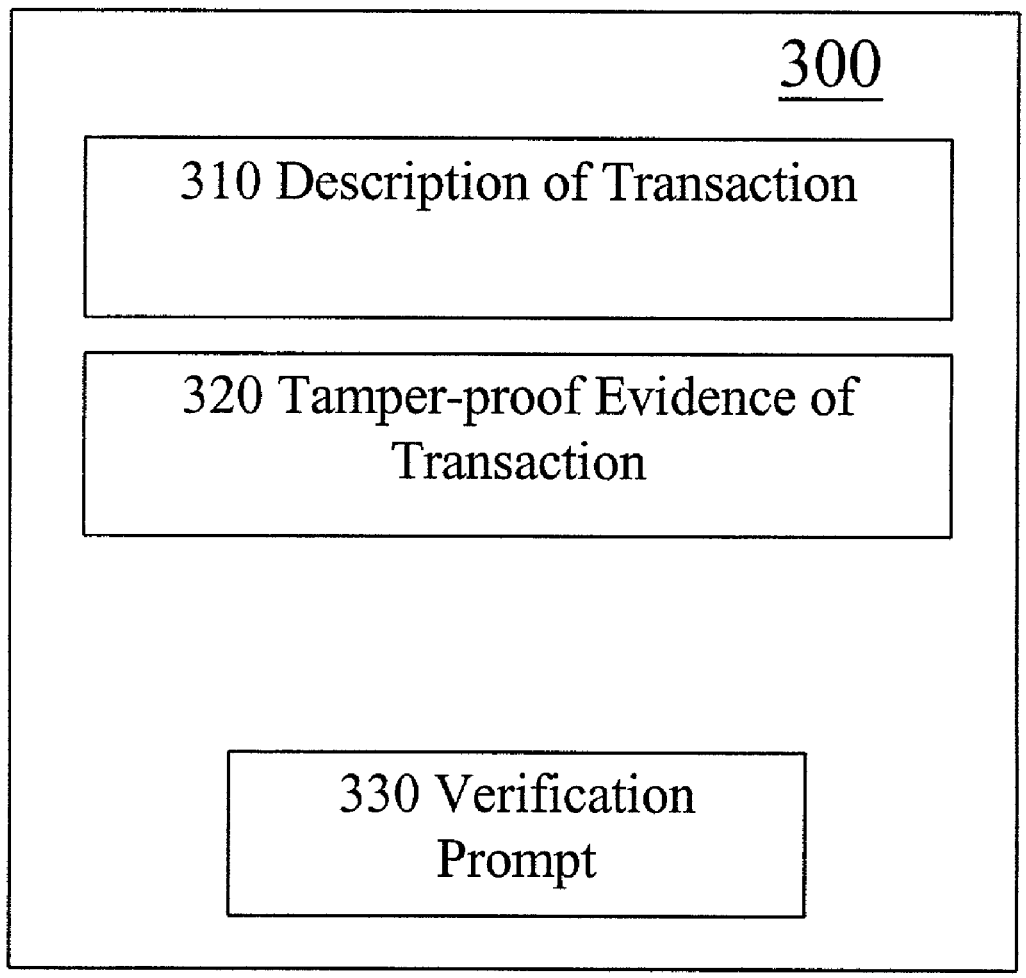
FIG. 3 is an illustration of a preferred embodiment of a digital receipt of a transaction according to the present invention.

The service provider 130 also creates 230 a second digital record of the transaction, an example of which is shown in FIG. 3. For convenience, this digital record will be referred to as a digital receipt. The digital receipt 300 typically includes a description 310 of the transaction. For example, it might include all or part of the human-understandable description received from the requesting user 110. The digital receipt also includes the tamper-proof evidence 320 generated by the service provider 130. In one embodiment, the tamper-proof evidence 320 itself is included as part of the digital receipt. In an alternate approach, the tamper-proof evidence 320 is included by reference, for example by including a pointer to the evidence as part of the digital receipt. In a preferred embodiment, the evidence 320 is included in the digital receipt but is hidden from human view since the evidence often will be unintelligible to humans. The digital receipt 300 also includes a verification prompt 330. When the verification prompt 330 is activated, the process of verifying the tamper-proof evidence 320 is initiated. Note that in this process, there is no need for a human to affirmatively identify which evidence is to be verified since the digital receipt 300 itself identifies the evidence 320. In one embodiment, activating the verification prompt 330 sends the evidence 320 to the service provider 130 for verification against the service provider's database 140. In an alternate embodiment, it results in local calculations to verify the evidence 320. Referring again to FIG. 2A, after the service provider 130 creates 230 the digital receipt, the digital receipt is transmitted 235 to the requesting user 110, who typically stores 237 it for later use. In one embodiment, the requesting user's software automatically stores 237 the digital receipt, transparent to the requesting user 110.

FIG. 2B illustrates one example of how a relying user 120 would use the digital receipt 300 to verify the past occurrence of the transaction. The relying user 120 accesses 260 the digital receipt 300. For example, the requesting user 110 might email or otherwise send a copy of the receipt 300 to the relying user 120 or the relying user 120 might request the receipt 300 from service provider 130 or retrieve the receipt 300 from a central database or directory. Upon display 265 of the receipt 300, the relying user 120 sees the description 310 of the transaction and the verification prompt 330. User 120 may also see the tamper-proof evidence 320, but not necessarily since the evidence 320 preferably is hidden from view. The relying user activates 270 the verification prompt 330, which initiates the verification process. In this particular example, the tamper-proof evidence 320 is extracted from the digital receipt and sent 280 to the service provider 130, which compares 290 the received evidence 320 against the corresponding record in database 140. If there is a match, the evidence 320 is verified. Otherwise, there is a lack of verification (assuming that the evidence has not been verified by other means). Either way, the result is sent 295 to the relying user 120. In a preferred embodiment, if the evidence 320 is verified, a second verification prompt is displayed. Activating 202 this prompt allows the relying user 120 to go one step further and verify 204 the underlying transaction (e.g., verify the integrity of the underlying document in the digital notary scenario).

Note that the digital receipt 300 includes both a verification prompt 330 and the tamper-proof evidence 320 to be verified. Hence, it is fairly self-contained and is in some sense "auto-verifying." This is a significant advantage since it makes the digital receipt 300 much easier and more intuitive to use. For example, there is no need for the requesting user 120 to independently identify which piece of evidence is to be verified. As another example, if the digital receipt did not include the verification prompt 330, separate software or instructions would be required to verify the evidence 320. This adds extra complexity since the relying user 120 might not know or have access to the required software and instructions, particularly since the relying user 120 and the requesting user 110 likely will be different entities and may use different service providers with incompatible systems. Even if the relying user 120 did use the same software, it simply might not be available at the moment. For example, the software might reside on one computer and the digital receipt 300 on a different one. By including both the tamper-proof evidence 320 and the verification prompt 330 in the same location, these problems are avoided. Furthermore, including the human-understandable description 310 also simplifies use of the digital receipt 300 since it provides a meaningful label for the digital receipt.

FIGS. 4-8 illustrate a preferred embodiment of system 100 and method 200 which occurs over an HTTP-based system, specifically the Internet. The users 110 and 120 access the Internet using a conventional web browser. The service provider 130 interfaces to the Internet via a web server. The requesting user 110 desires to make a record that a specific document existed at a specific time. In essence, the requesting user 110 is seeking a digital notary and this function is provided by the service provider 130. The relying user 120 later desires to verify the "notarization" claimed by the requesting user 110 and perhaps also to verify the contents of the specific document. As with method 200, method 400 can be roughly divided into two stages: record creation 400 and record verification 450, as illustrated in FIGS. 4A and 4B respectively.

Figure 4A:
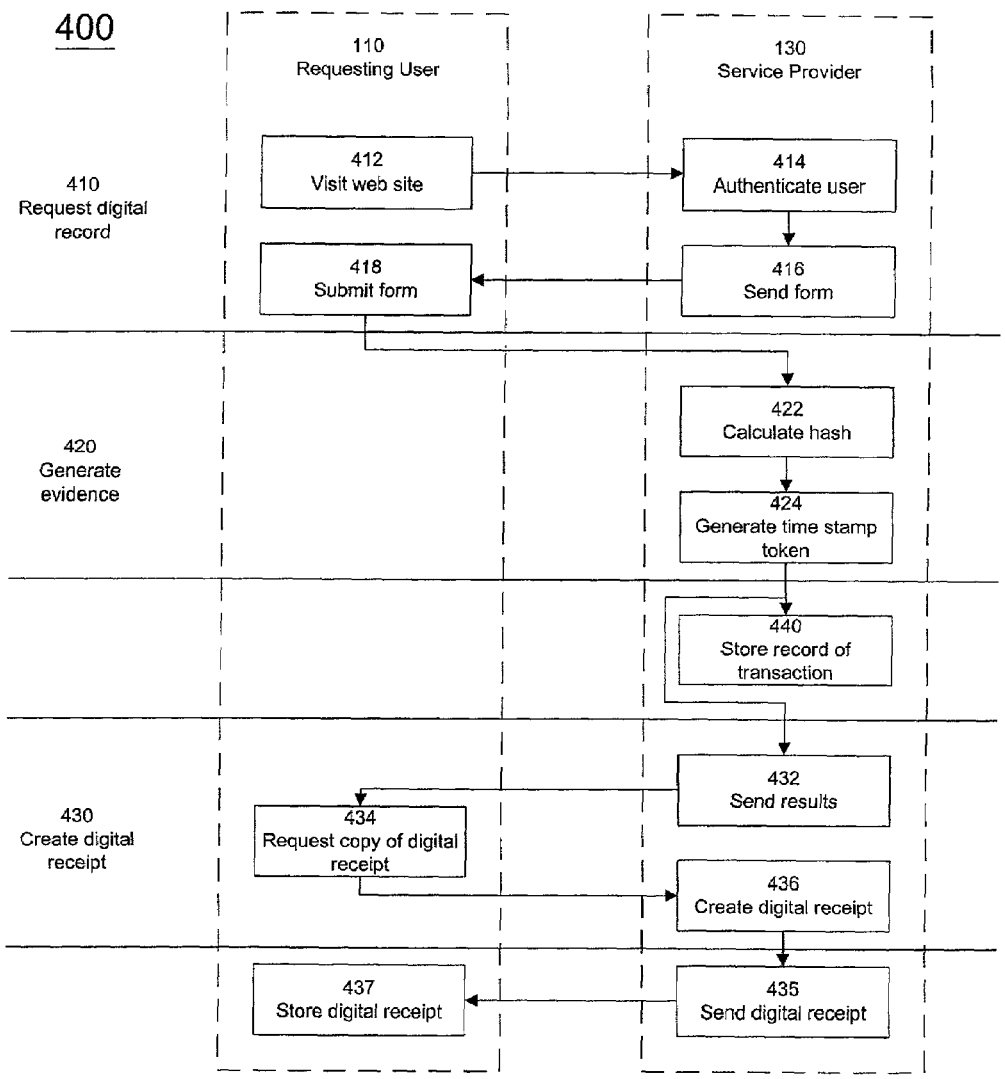
FIGS. 4A and 4B are event traces illustrating a preferred method of operating the system of FIG. 1.

Referring to FIG. 4A, the requesting user 110 begins by sending 410 to the service provider 130 a request to create a digital record of a transaction. In this embodiment, the requesting user 110 does so by visiting 412 the service provider 130's web site at an SSL URL which provides the notarization service. The user 110 authenticates 414 himself to the service provider 130 via a digital certificate and corresponding key pair. For purposes of the notarization service, the identity of the requesting user 110 is defined by the digital certificate. The user 110 navigates 416 through the service provider 130's web site to select the digital notarization service and requests the service by completing and submitting 418 the HTML form 500 shown in FIG. 5. In this embodiment, the form 500 is available from the service provider 130's web site. In alternate embodiments the same functionality may be implemented by other forms from other sources or as an embedded function in an application (e.g., as a "notary" button added to a toolbar in a word-processing application or to the printer driver). In form 500, the user 110 identifies the document to be notarized in box 510 and also includes a description of the document in box 520. Upon submission 418, this information is digitally signed by the user 110 and sent to the service provider 130. In addition to the document name 510 and description 520, the document itself is also sent to the service provider 130.

From the information received from the user 110, the service provider 130 generates 420 tamper-proof evidence of the document, which in this example is a time stamp token generated as follows. The service provider 130 calculates 422 a hash of the received document (e.g., using the SHA-1 hash algorithm) and then generates 424 a time stamp token of the hash. In a preferred embodiment, the service provider generates 424 the time stamp token by requesting one from a trusted time stamping authority. The time stamp token includes the hash of the document, the time stamp, information identifying the time stamping authority, and the time stamping authority's digital signature of all of the foregoing. In a preferred embodiment, the time stamp token follows the protocol described in the Internet Engineering Task Force's working draft entitled "Internet X.509 Public Key Infrastructure, Time Stamp Protocol (TSP), draft-ietf-pkix-timestamp." In alternate embodiments, the evidence may take other forms. For example, the time stamping aspect may be omitted or a fingerprint of the document other than a hash may be used. The fingerprint pf the document preferably uniquely identifies the document.

The service provider 130 stores 440 a record of the notarization in its database 140. This record includes the user 110's request for notarization (which was digitally signed by the user 110), the user 110's identity, the hash of the document and the time stamp token.

Figure 7:
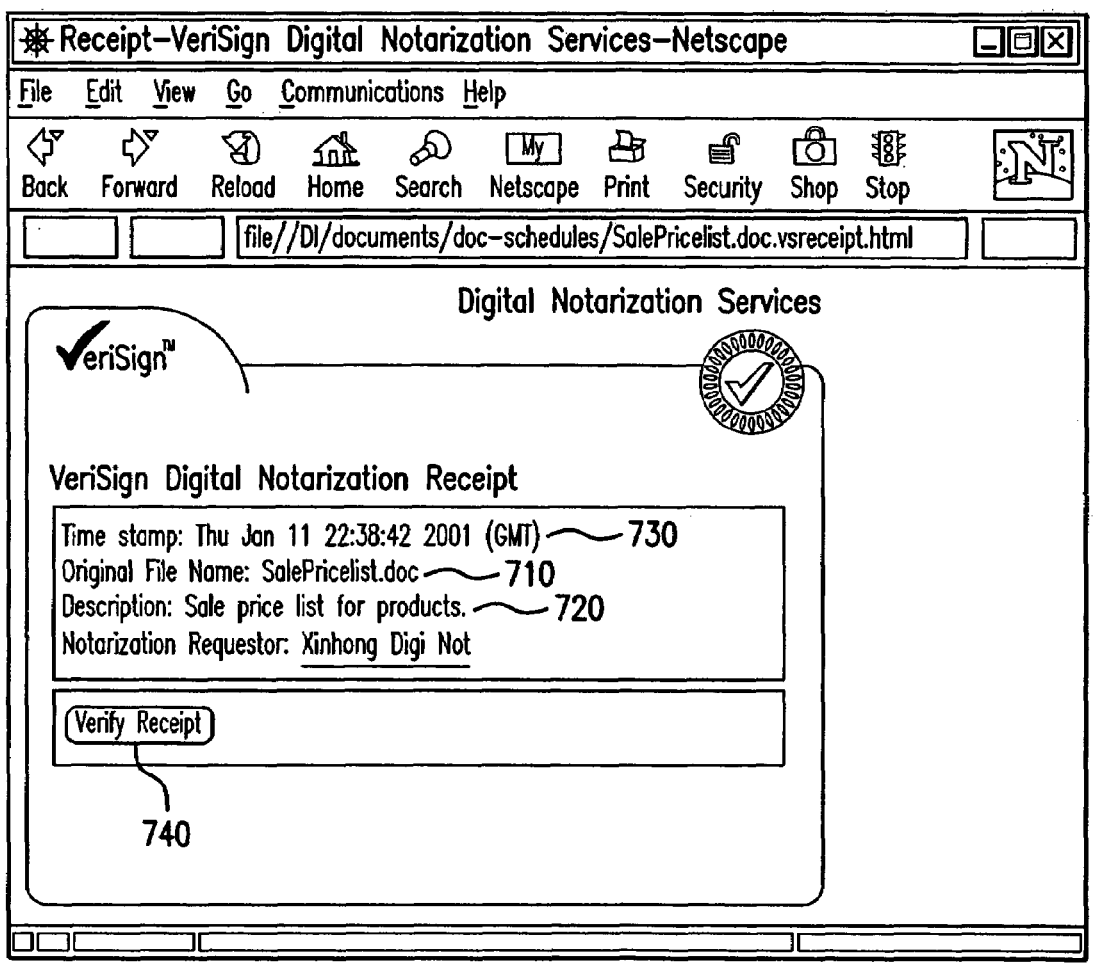

The service provider 130 also creates 430 a digital receipt of the transaction for transmission to the requesting user 110. FIG. 7 shows an example of this digital receipt 700. It is an HTML document which includes the following as viewable elements: the name 710 and description 720 of the document as received from the requesting user 110, and the time 730 for the time stamp. The digital receipt 700 also includes a form. The time stamp token is encoded into BASE64 text format and embedded into the form as a hidden form field and therefore does not appear in the display of the digital receipt 700.

The form in digital receipt 700 also includes a "Verify Receipt" button 740 (shown as a button in this embodiment, but also implementable as other types of user-activated elements). In a preferred embodiment, the form within digital receipt 700 has the following structure:

```
<form method = post action = "https://serviceprovider.com/">
    <input type = "hidden" value = "V1">
    <input type = submit value = "Verify">
</form>
```

"https://serviceprovider.com/" is the SSL URL of the service provider 130. The value "V1" is the BASE64 encoded version of the time stamp token. Other fields may be used to support additional functionality or provide additional information. For example, the requesting user 110 may also be identified in the digital receipt 700.

Figure 6:
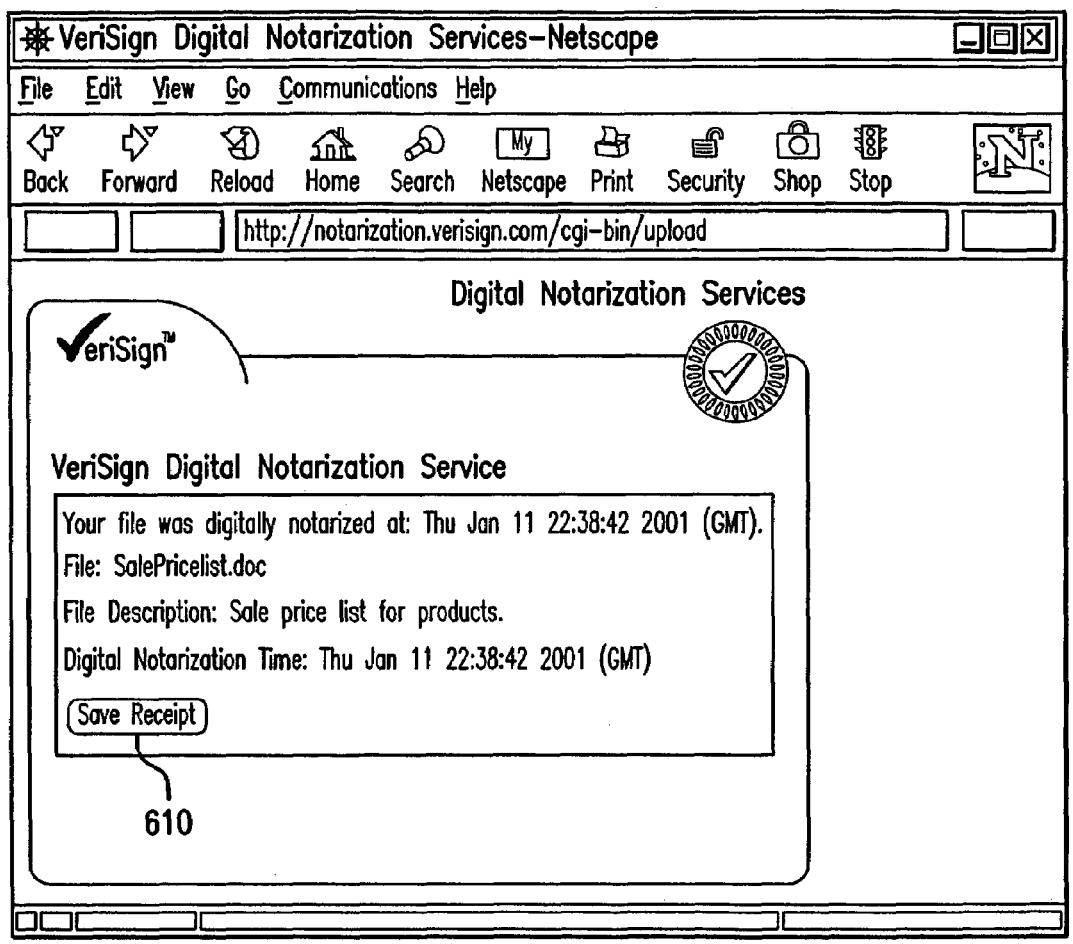

In a preferred embodiment, the digital receipt 700 is not automatically generated and sent to the requesting user 110. Rather, the service provider 130 sends 432 the results of the notarization to the user 110, as shown in FIG. 6. If the notarization was successful, the results screen 600 also prompts the user 110 whether it would like to have a copy of the digital receipt 700. If the user 110 requests 434 a copy (e.g., by clicking on button 610 in this example), the service provider creates 436 and transmits 435 the digital receipt 700 to the user 110. The requesting user 110 stores 437 the digital receipt 700, for example on its local hard drive.

Figure 4B:
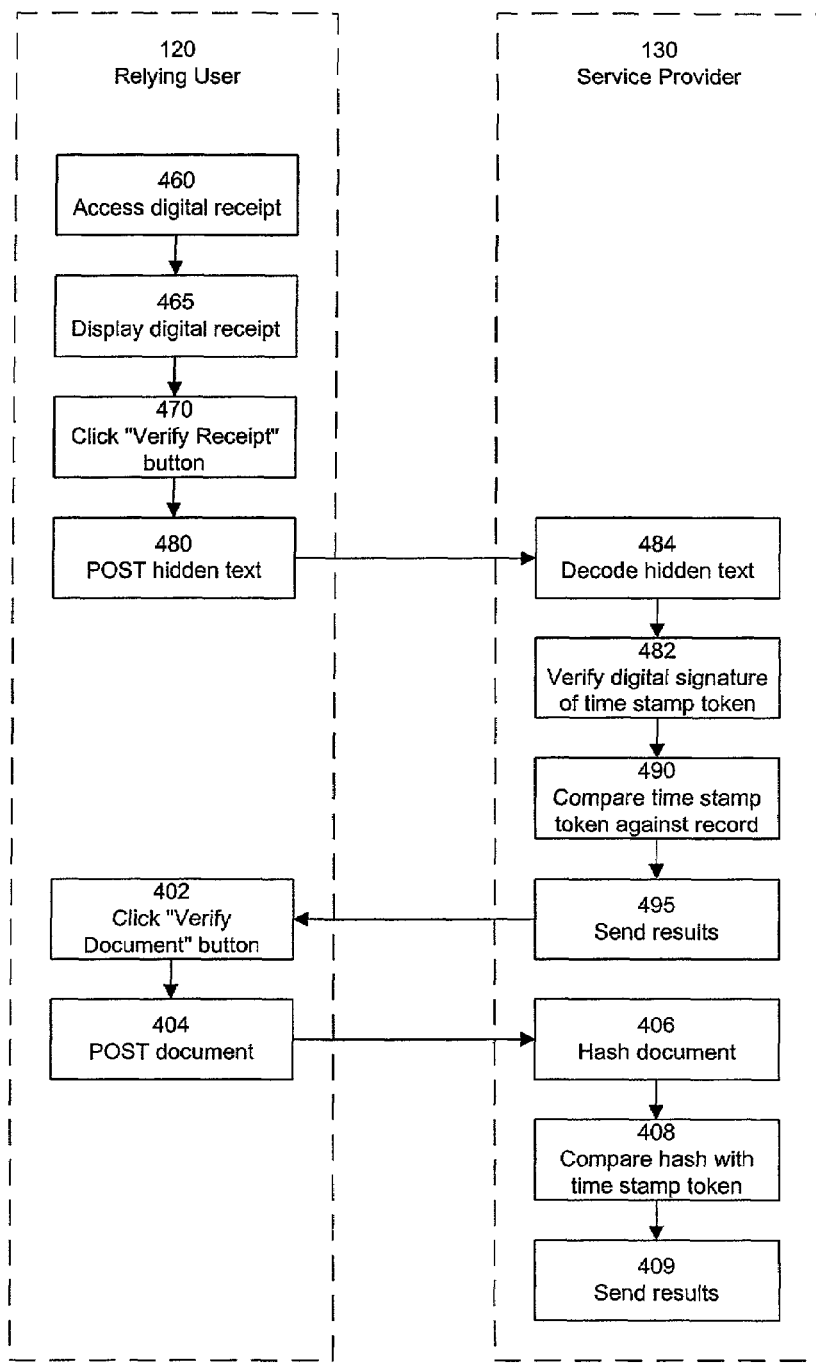
Figure 5:
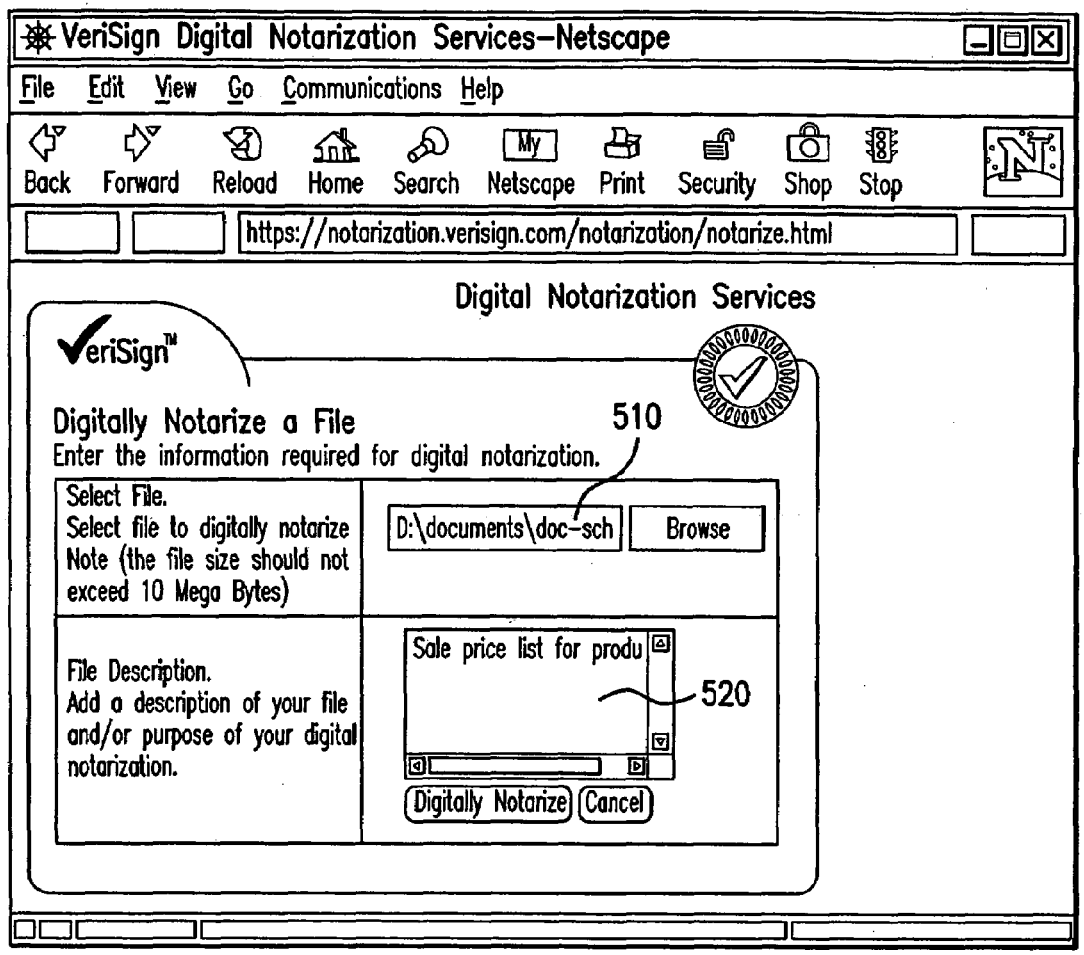
FIGS. 5-8 are various forms and dialog boxes illustrating the method of FIG. 4.

FIG. 4B illustrates one example of how a relying user 120 would use the digital receipt 700 to verify the notarization. The relying user 120 accesses 460 the digital receipt 700. User 120 might have access to the copy of receipt 700 saved by the requesting user 110. Alternately, user 120 might receive a copy from the requesting user 110 or from the service provider 130. In an alternate scenario, the requesting user 110 posts both the digital receipt and the underlying document on the Internet. For example, the requesting user 110 might be a company issuing press releases and would post both the press release and the digital receipt on its web site, so that interested parties can verify the authenticity of the press release.

The relying user 120 opens 465 the digital receipt 700, including the HTML form, using its web browser. As mentioned previously, the display of the digital receipt includes the name 710 and description 720 of the document, the time 730 for the time stamp, and a "Verify Receipt" button 740.

Clicking 470 button 740 transmits 480 the time stamp token which is embedded in the HTML form as hidden text to the service provider 130. In this embodiment, the hidden text is POSTed 480 to the service provider 130. The service provider 130 decodes 484 the BASE64 text encoding in order to retrieve the original time stamp token. It verifies 482 the trustworthiness of the time stamp token by examining the digital signature and then compares 490 the recovered time stamp token with those in its own database 140. The time stamp token is verified if it exactly matches the one in the serivce provider 130's database. The service provider 130 sends 495 the results of the comparison to the relying user 120, thus either verifying or not verifying the trustworthiness of the digital receipt 700.

Figure 8:
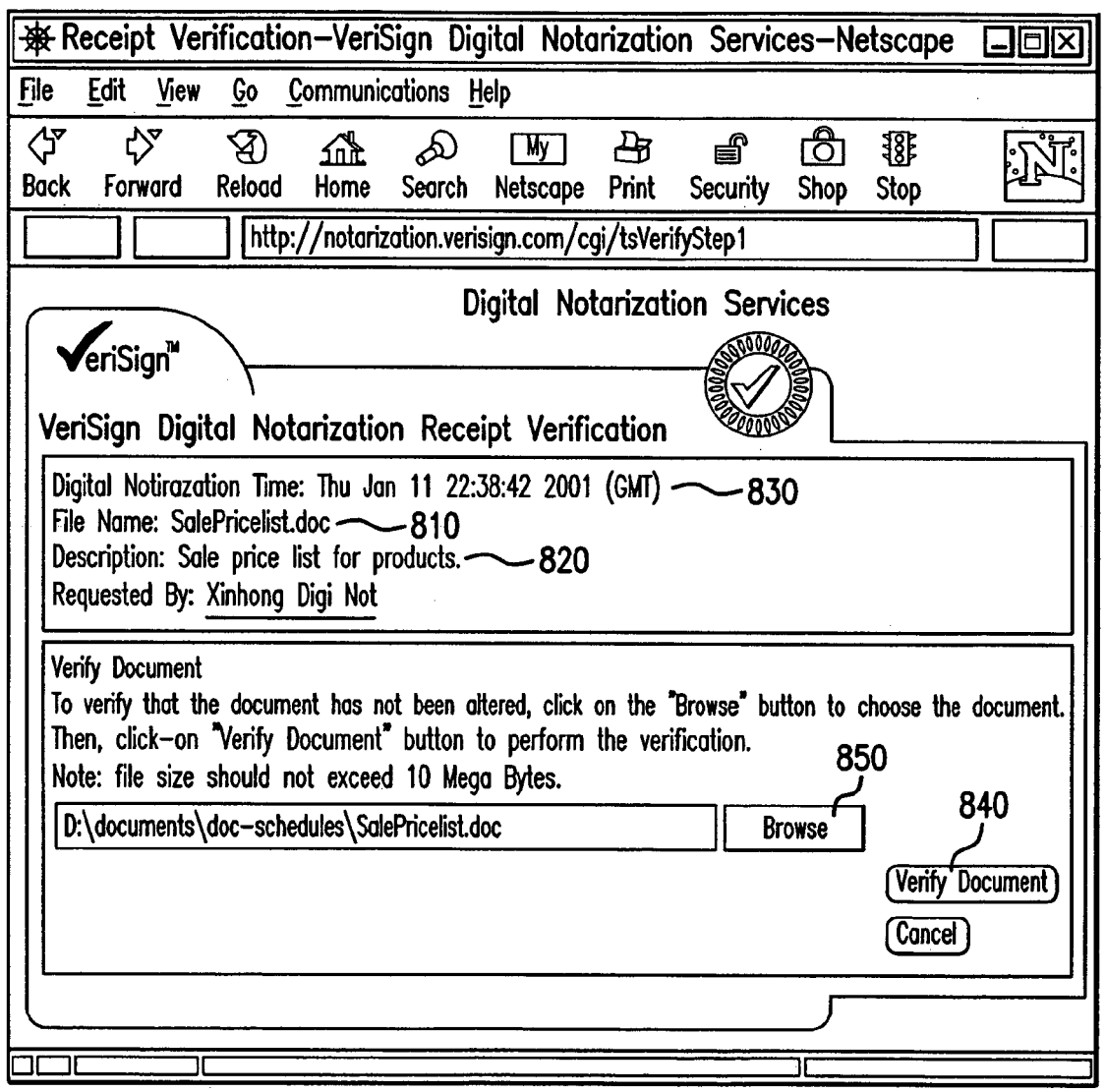

If the digital receipt 700 is verified, the service provider 130 also sends the requesting user 110's identity, the original name of the document 810, the description of the document 820 and the time 830 for the time stamp, as retrieved from the service provider 130's database 140, as shown in FIG. 8. The response 800 also includes a form with a second verification prompt 840, which allows the relying user 120 to go one step further and verify the underlying document in addition to verifying the notarization.

Note that so far, only the digital receipt 700 has been verified but the underlying document itself has not been verified. Furthermore, the service provider 130 does not provide a copy of the document nor does it store a copy of the document in this embodiment, although it could do so in alternate embodiments. If the relying user 120 wishes to rely on the contents of the document, it may first want to verify the integrity of those contents. It can do so by using the "Verify Document" button 840. For example, if it is represented that the document D:\documents\doc-schedules\SalePricelist.doc is the same as the document which was notarized, the relying user 120 identifies the document using the "Browse" field 850 and then clicks 402 the "Verify Document" button 840. This POSTs 404 the document D:\documents\doc-schedules\SalePricelist.doc to the service provider 130. Information used to identify the time stamp token is also POSTed to the service provider 130. For example, in a preferred embodiment, the serial number of the time stamp token and the hash of the document (as retrieved from the service provider's database) are embedded in the response 800 as hidden form fields and then POSTed to the service provider 130 when the "Verify Document" button 840 is activated. The service provider 130 hashes 406 the received document. The newly generated hash is compared 408 with the hash in the time stamp token, with the result returned 409 to the relying user 120. If the two hashes match, there is a good basis to believe that the received document is the same as the original. If the hashes do not match, there is reason to believe that the document has been altered.

Figure 9:
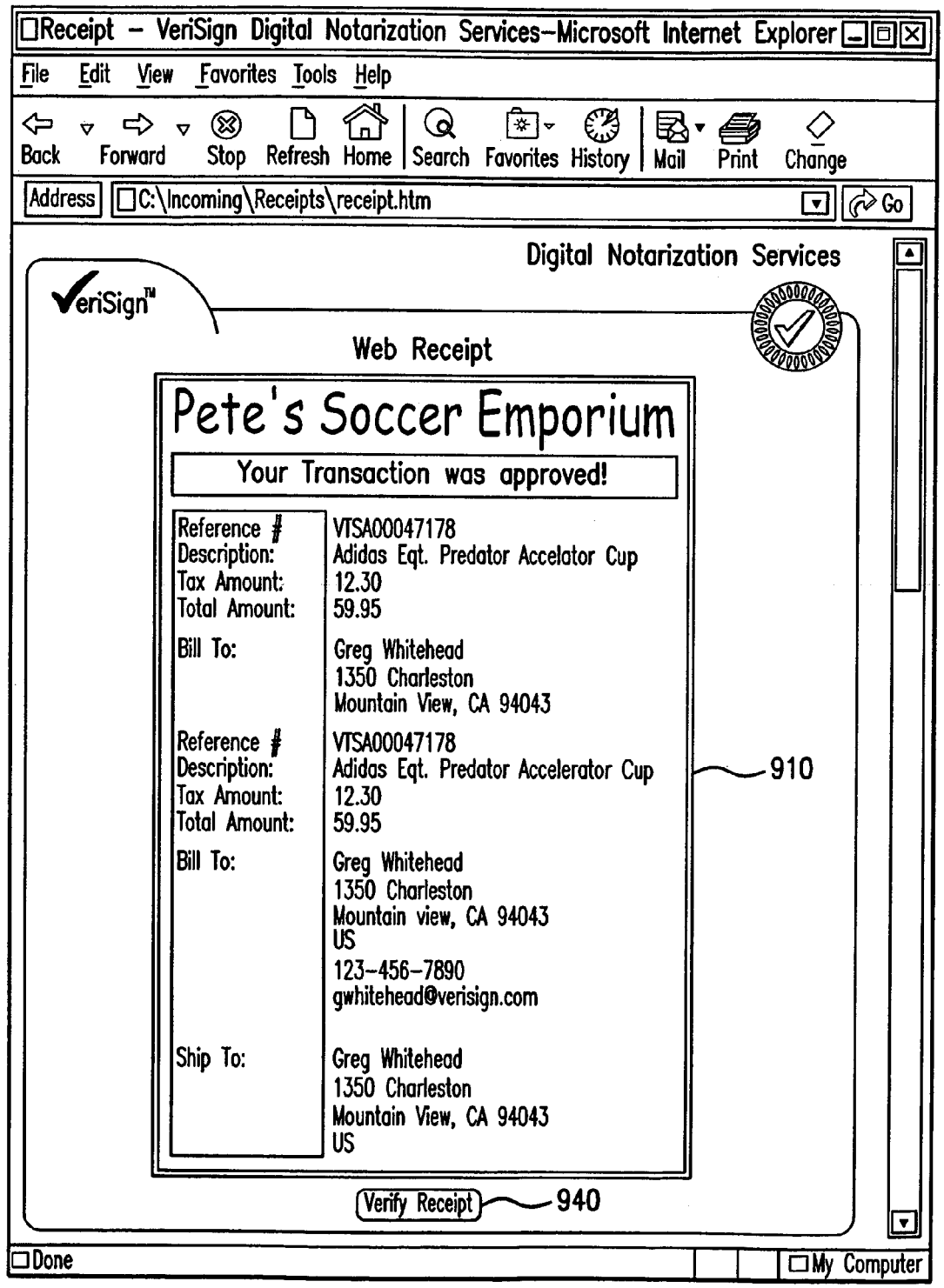
FIG. 9 is a form illustrating an alternate embodiment of the method of FIG. 4.

In an alternate embodiment, the document itself is included as part of the digital receipt and so can be verified at the same time as the digital receipt. FIG. 9 is an example of a digital receipt 900 illustrating this approach. In this example, Greg Whitehead has purchased the Accelerator Cup for $59.95. As evidence of this transaction, the document 910 is generated and a timestamp of the document is also generated. The digital receipt 900 for this transaction includes document 910 as a viewable element. More accurately, document 910 may originally exist as a separate stand-alone HTML document. Typically, not all of this original document is included in the digital receipt 900. For example, at the very least, the begin and end document tags for the original HTML document are not required. Thus, some reformatting and possibly also editing typically takes place in embedding the original HTML document 910 into the digital receipt 900. It should be understood that this is generally the case, although the distinction will not be explicitly mentioned again.

In one implementation, the digital receipt also includes an HTML form and document 910 is encoded into BASE64 text format and embedded into the form as a hidden form field. The digital receipt 900 also includes javascript code, which decodes and displays the BASE64 hidden text, which is why document 910 is viewable within digital receipt 900. In this example, the document 910 also serves as a description of the transaction. The form within digital receipt 900 also includes the time stamp token, but the time stamp token is encoded into BASE64 text format and embedded into the form as a hidden form field and therefore does not appear in the display of the digital receipt 900. The form also includes a "Verify Receipt" button 940. In a preferred embodiment, the form is implemented as follows:

```
<form method = post action = "https://serviceprovider.com/">
    <input type = "hidden" value = "V1">
    <input type = "hidden" value = "V2">
    <input type = submit value = "Verify">
</form>
```

"https://serviceprovider.com/" is the SSL URL of the service provider 130. The value "V1" is the BASE64 encoded version of the time stamp token and the value "V2" is the BASE64 encoded version of the document 910. In an alternate embodiment, the values "V1" and "V2" are pointers to the time stamp token and document, respectively, rather than the actual token and document.

Clicking button 940 POSTs values V1 and V2 (i.e., the BASE64-encoded versions of the time stamp token and document 910) to the service provider 130. The service provider 130 decodes the BASE64 text encoding in order to retrieve the original time stamp token and document 910. It verifies the trustworthiness of the time stamp token by examining the digital signature and compares the recovered time stamp token with those in its own database 140. The service provider 130 also verifies the authenticity of document 910. The service provider 130 sends the results of these comparisons to the relying user 120, thus either verifying or not verifying the trustworthiness of the digital receipt 900, including document 910. In an alternate embodiment, some or all of the computations (e.g., verifying the authenticity of the document 910) may occur locally at the relying user 120's client.

Figure 10:
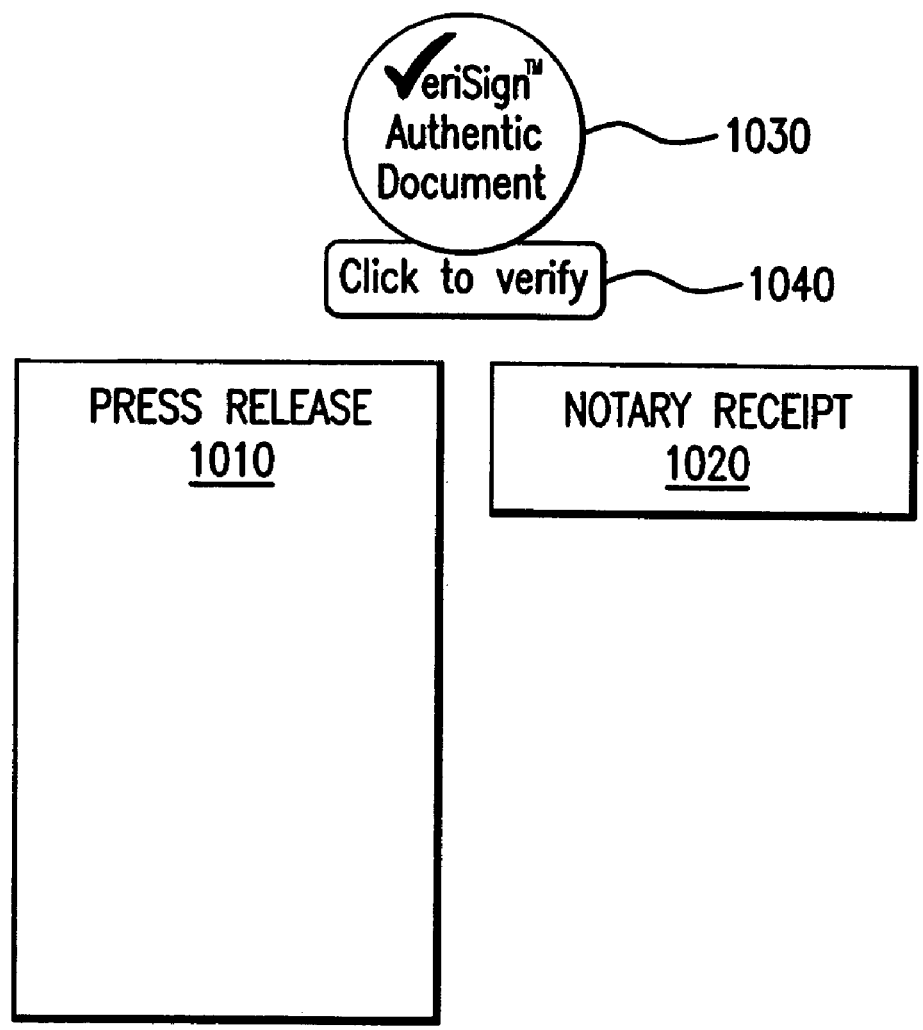
FIG. 10 is a screen shot illustrating yet another embodiment according to the invention.

In a variation of this approach, rather than having the digital receipt contain the timestamp token, the underlying document, and the Verify button, these three elements are posted to the Internet separately, as shown in FIG. 10. In FIG. 10, the underlying document 1010, a press release, is presented in one location. A "notary receipt" 1020, which contains the timestamp token, is presented separately; as is a "seal" 1030, which is a form containing the Verify button 1040 and pointers to the document and the timestamp token. In this example, the physical placement is used to indicate that notary receipt 1020 and seal 1030 correspond to press release 1010. Although the physical placement looks different, activating the Verify button 1040 has the same effect as activating the Verify button in the previous examples. Specifically, both the timestamp token and the underlying document are POSTed to the service provider 130 for verification. In other words, the seal 1030 in this scenario plays a similar role as the digital receipts 700 and 900 with respect to initiating the verification process.

Although the invention has been described in considerable detail with reference to certain preferred embodiments thereof, other embodiments will be apparent. For example, the examples of FIGS. 4-10 were described in the context of HTML documents, but XML and other standard markup languages are equally suitable for use. In one embodiment using XML, a document type for the digital receipt is defined, and element types, attributes, entities and notations for the content in the digital receipt are declared. In an alternate embodiment, binary files may also be used, with fields within the files defined to provide similar functionality. As another example, most of the examples have been discussed in the context of documents and timestamp tokens themselves (or, more generally, in the context of transactions and the corresponding evidence). However, as illustrated in some of the examples, alternate implementations may use references or pointers instead. As a final example, in most of the discussion, the service provider 130 implements the functionality required to verify certain facts. However, some or all of this functionality may also be implemented by clients residing with the users 110,120. In addition, the functionality may be implemented offline or processed in batch mode. Therefore, the scope of the appended claims should not be limited to the description of the preferred embodiments contained herein.

The invention claimed is:

1. A computer readable medium storing instructions that are configured to be executed by a computer, the instructions causing a computer to perform steps of:
   receiving a request from a requesting user to create a digital receipt of a transaction including verifying an existence of a user-specified document at a specific time;
   generating tamper-proof evidence of the transaction; and
   creating a digital receipt of the transaction suitable for display to humans, the digital receipt comprising:
      a description of the transaction in a format understandable by humans;
      the tamper-proof evidence of the occurrence of the transaction;
      a verification prompt for display to the requesting or other user, activated by interaction of the requesting or other user, for verifying the tamper-proof evidence without requiring further human interaction to identify the tamper-proof evidence; and
      a second verification prompt for display to the requesting user upon receipt of verification of the tamper-proof evidence, activated by interaction of the requesting user, for verifying the transaction,
   wherein, the tamper-proof evidence comprises a digitally signed time stamp token comprising:
      a fingerprint of the document; and
      a time stamp for the document.

2. The computer readable medium of claim 1 wherein, upon display of the digital receipt, the description of the transaction and the verification prompt are displayed but the tamper-proof evidence is not displayed.

3. The computer readable medium of claim 1 wherein the document is provided by the requesting user.

4. The computer readable medium of claim 1 wherein the tamper-proof evidence is included by reference in the digital receipt.

5. The computer readable medium of claim 1 wherein the digital receipt is in a standard markup language.

6. The computer readable medium of claim 5 wherein the tamper-proof evidence is encoded as hidden text.

7. The computer readable medium of claim 6 wherein:
   the digital receipt includes a form in the standard markup language;
   the tamper-proof evidence is encoded as hidden text in the form; and
   the verification prompt comprises a user-activated element in the form, wherein activation of the user-activated element transmits the hidden text to a service provider for verification.

8. The computer readable medium of claim 6 wherein:
   the digital receipt includes a form in the standard markup language;
   the description of the transaction comprises:
      a name identifying the document, and
      a time identifying the specific time;
   the tamper-proof evidence comprises a digitally signed time stamp token encoded as hidden text in the form, and
   the verification prompt comprises a user-activated element in the form, wherein activation of the user-activated element transmits the hidden text to a service provider for verification.

9. A method for creating a record of an occurrence of a transaction executed by a computer processor including verifying an existence of a user-specified document at a specific time comprising:
   receiving a request from a requesting user to create a digital receipt of the transaction, the transaction including verifying the existence of the user-specified document at a specific time;
   generating tamper-proof evidence of the occurrence of the transaction; and
   creating a digital receipt of the transaction suitable for display to humans, the digital receipt comprising:
      a description of the transaction in a format understandable by humans;
      the tamper-proof evidence of the occurrence of the transaction;
      a verification prompt for display to the requesting user, activated by interaction of the requesting user, for verifying the tamper-proof evidence without requiring further human interaction to identify the tamper-proof evidence; and
      a second verification prompt for display to the requesting user upon receipt of verification of the tamper-proof evidence, activated by interaction of the requesting user, for verifying the transaction,
   wherein, the tamper-proof evidence comprises a digitally signed time stamp token comprising:
      a fingerprint of the document; and
      a time stamp for the document.

10. The method of claim 9 wherein, upon display of the digital receipt, the description of the transaction and the verification prompt are displayed but the tamper-proof evidence is not displayed.

11. The method of claim 9 wherein the tamper-proof evidence is included by reference in the digital receipt.

12. The method of claim 9 wherein the step of generating tamper-proof evidence of the occurrence of the transaction comprises:
   receiving the tamper-proof evidence from a third party.

13. The method of claim 9 wherein the step of creating a digital receipt comprises creating the digital receipt in a standard markup language.

14. The method of claim 13 wherein the step of creating the digital receipt further comprises encoding the tamper-proof evidence as hidden text in the digital receipt.

15. The method of claim 14 wherein:
   the digital receipt includes a form in the standard markup language; and
   the step of creating the digital receipt further comprises:
      encoding the tamper-proof evidence as hidden text in the form; and
      implementing the verification prompt as a user-activated element in the form, wherein activation of the user-activated element transmits the hidden text to a service provider for verification.

16. The method of claim 14 wherein:
   the digital receipt includes a form in the standard markup language; and
   the step of creating the digital receipt comprises:
      including a name identifying the document and a time identifying the specific time as part of the description of the transaction;

encoding the digitally signed time stamp token as hidden text in the form; and implementing the verification prompt as a user-activated element in the form, wherein activation of the user-activated element transmits the hidden text to a service provider for verification.

17. The method of claim 9 further comprising:
transmitting the digital receipt to the requesting user.

18. A method for verifying the past occurrence of a transaction using a computer processor, the transaction including verifying an existence of a user-specified document at a specific time, said method comprising:

displaying a digital receipt of the transaction to a requesting user, the digital receipt comprising:
  a description of the transaction in a format understandable by humans;
  tamper-proof evidence of the occurrence of the transaction; and
  a verification prompt;
activating, by a first human interaction of the requesting user, the verification prompt, whereby the tamper-proof evidence is verified without requiring further human interaction to identify the tamper-proof evidence;
receiving verification of the tamper-proof evidence; and
upon receipt of verification of the tamper-proof evidence, displaying a second verification prompt for verifying the transaction,
wherein, the tamper-proof evidence comprises a digitally signed time stamp token comprising:
  a fingerprint of the document; and
a time stamp for the document.

19. The method of claim 18 wherein the step of displaying the digital receipt comprises:
displaying the description of the transaction and the verification prompt; and not displaying the tamper-proof evidence.

20. The method of claim 18 wherein: the digital receipt is in a standard markup language; and the tamper-proof evidence is encoded as hidden text.

21. The method of claim 18 wherein:
the digital receipt is in a standard markup language;
the step of displaying the digital receipt comprises:
  displaying the digital receipt as a form;
  displaying a name identifying the document and a time identifying the specific time;
  not displaying the digitally signed time stamp token encoded as hidden text in the form; and
  displaying the verification prompt as a user-activated element in the form, wherein activation of the user-activated element transmits the hidden text to a service provider for verification;
the step of receiving verification of the tamper-proof evidence comprises receiving verification from the service provider as to whether the fingerprint and time stamp in the hidden text transmitted to the service provider match an independently maintained record of the transaction; and
the step of displaying a second verification prompt comprises displaying a prompt to verify whether the fingerprint in the hidden text matches a fingerprint of a second document alleged to be identical to the document in existence at the specific time.

22. The method of claim 20 wherein:
the digital receipt includes a form in the standard markup language;
the tamper-proof evidence is encoded as hidden text in the form; and
the verification prompt comprises a user-activated element in the form, wherein activation of the user-activated element transmits the hidden text to a service provider for verification.

* * * * *